United States Patent
Bomba

[11] 3,988,858
[45] Nov. 2, 1976

[54] METHOD OF CULTIVATING EPIPHYTICALLY GROWING PLANTS

[76] Inventor: Gerhard Bomba, Klingenbergerstrasse 5, D-6 Frankfurt am Main 70, Germany

[22] Filed: Mar. 26, 1975

[21] Appl. No.: 562,159

[30] Foreign Application Priority Data
Apr. 6, 1974 Germany............................ 2416791
Oct. 12, 1974 Germany............................ 2448729

[52] U.S. Cl........................................ 47/58; 47/39; 47/1.2
[51] Int. Cl.² ..................... A01G 31/00; A01G 9/02
[58] Field of Search ................. 47/1.2, 35, 48.5, 58, 47/34.12, 39; 24/5; 248/27.8

[56] References Cited
UNITED STATES PATENTS

| | | | |
|---|---|---|---|
| 883,001 | 3/1908 | Curtis | 47/36 X |
| 1,058,566 | 4/1913 | Dunlap | 47/48.5 |
| 2,113,523 | 4/1938 | White | 47/1.2 |
| 2,956,370 | 10/1960 | Wieboldt | 47/1.2 |
| 2,988,441 | 6/1961 | Pruitt | 47/58 X |
| 3,608,238 | 9/1971 | Reuter | 47/1.2 |
| 3,664,062 | 5/1972 | Danielson | 47/34.13 |
| 3,667,157 | 6/1972 | Longhini | 47/35 |
| 3,835,584 | 9/1974 | Shimazu | 47/1.2 |
| 3,866,352 | 2/1975 | Herveling et al. | 47/1.2 |

FOREIGN PATENTS OR APPLICATIONS
474,210   4/1966   Switzerland........................ 47/34.12

OTHER PUBLICATIONS

Plant & Soil Water Relationships: A Modern Synthesis by Kramer McGraw1-Hill Book Co. 1969 pp. 98 and 99.
The Standard Cyclopedia of Horticulture by L. H. Bailey vol., I, A-E. p. 687, The Macmillian Company, New York, 1943.

*Primary Examiner*—Edgar S. Burr
*Assistant Examiner*—James R. Feyrer
*Attorney, Agent, or Firm*—Spencer & Kaye

[57] ABSTRACT

A method of cultivating epiphytically or semi-epiphytically living plants, comprises the steps of individually attaching the plants to a non-native substrate in their seeding stage when they already have recognizable leaves and roots; throughout their cultivation, maintaining the plants in a dry condition at daytime; and throughout their cultivation, maintaining the plants in a wet condition from nightfall until daybreak by thorough watering.

9 Claims, 1 Drawing Figure

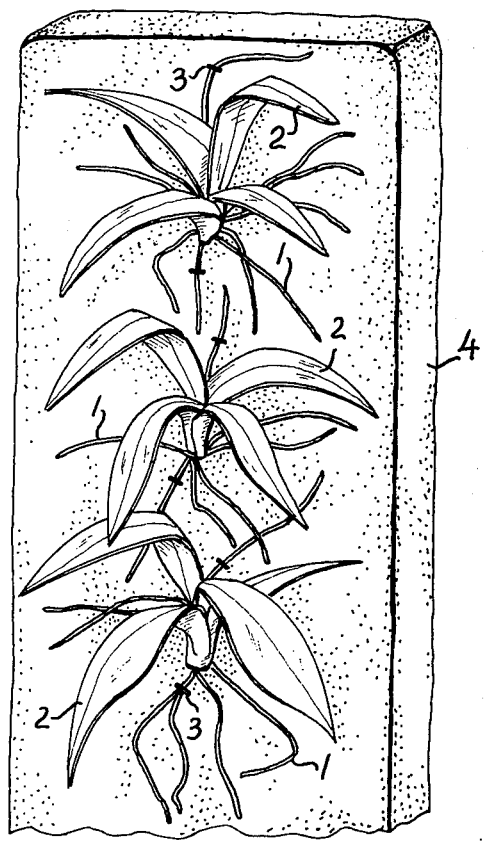

METHOD OF CULTIVATING EPIPHYTICALLY GROWING PLANTS

BACKGROUND OF THE INVENTION

This invention relates to a method of cultivating epiphytically growing plants, also called "epiphytes", which live on the surface of trees, bushes, rocks, stones or similar substrates and which do not participate in the nutrition circuit of the plants or take nutrients from the matter of the inorganic substrates on which they grow. The invention also relates to epiphytically living semi-epiphytes; these are plants which, dependent upon the given environmental conditions, may live either on the ground with roots extending thereinto or may live as epiphytes on one of the above-listed substrates. The transition between epiphytes and semi-epiphytes is gradual. In both types of plants the roots serve principally as supporting organs.

At the present time, epiphytically living plants, particularly orchids, are in most cases cultivated as follows:

1. The ripe seed is sowed under sterile conditions on special growing media where it germinates for days or even weeks.
2. After approximately 6 months it is often necessary to transplant the developed seedling, again under sterile conditions, into other growing media to provide more living space and fresh nutrients.
3. After about 8–12 months the seedlings have grown recognizable roots and leaves and are then removed from the sterile growing media and transplanted into "flats". The growing media used in the flats have widely varying compositions and in most cases comprise peat, sand and charcoal.
4. In the 12 months that follow, multiple transplants in ever increasing plant-to-plant distances are necessary. The total period elapsed from sowing to the end of this stage is 24–30 months.
5. In the months which follow, the plants may be individually transplanted into small pots of a diameter of approximately 3–5 cm.
6. In the course of their development the plants are, in every two to three years, transplanted into larger pots. They bloom for the first time only in approximately 5 to 7 years.

For the potting of the plants, various growing media are used such as Osmunda fern roots, peat moss, dry leaves, peat in various forms, bark pieces, polystyrene foam flakes, tree fern fibers and chunks. These materials may be used either alone or in mixture. Each orchid grower has, more or less, his own "recipe".

The above-outlined process requires a very substantial work input, high costs of growing medium and expensive, experienced personnel. The growing media are expensive even in their acquisition and become even more so because of the necessity of a complex cleaning and mixing. The potting work is very time-consuming because many growing media tend to be unyielding and have to be thoroughly tamped. All of the above-listed potting material, with the exception of the polystyrene flakes, decompose in time and lose their desired loose structure which ensures in the pot a sufficient air admission to the roots of the potted plants. The more the potting material is decomposed the more sensitive the roots become to excessive amounts of wetness. For this reason, the plants have to be watered with the utmost care by experienced personnel who are in a position to judge to what extent the pot has dried. As soon as the potting material has decomposed to an excessive extent, the plant has to be transplanted into a pot having fresh growing medium.

According to the known cultivating processes, the potted plants are watered during daytime and the plants should again be dry by nightfall. Certain small-size plant varieties are individually tied to plates made of bark or tree fern, with the addition of moss or fern roots in the root zone which is generally designated as "block culture". The treatment is the same as in the case of potted plants.

SUMMARY OF THE INVENTION

It is an object of the invention to replace the above-outlined conventional, in its outcome uncertain, method of cultivating plants living epiphytically by a simple, almost entirely mechanizable and positively controllable cultivating process with which substantial savings in labor and material input may be accomplished.

This object and others to become apparent as the specification progresses, are accomplished by the invention, according to which, briefly stated, the epiphytically or semi-epiphytically living plants are cultivated by a method which includes the steps of individually attaching the plants to a non-native substrate in their seedling stage when they already have recognizable leaves and roots; throughout their cultivation, maintaining the plants in a dry condition at daytime; and throughout their cultivation, maintaining the plants in a wet condition from nightfall until daybreak by thorough watering.

BRIEF DESCRIPTION OF THE DRAWING

The sole FIGURE is a fragmentary perspective view illustrating a preferred mode of plant attachment according to the invention.

DETAILED DESCRIPTION OF THE METHOD

With the process according to the invention it is possible to develope epiphytically and semi-epiphytically growing plants without the use of soil or other plant growing medium and without the use of flower pots or other plant receptacles and beds. The plants are, for treatment according to the invention, secured to non-decaying plates or bodies and irrigated with water (which occasionally may be enriched by nutrients) depending upon the genus or species of the given plant. The water quantities required in each case depend, of course, from the genus and species of the given plant and can be routinely determined by a person skilled in the art. According to the invention, it is possible to separate the steps of the above-noted known process from the necessity of individual treatment of the individual plants and, in this manner, to dispense almost entirely with the manual work and use of material required heretofore and to replace it by an almost entirely automated cultivating process.

The method according to the invention is based on findings relating to the epiphytic growth of epiphytically living plants. In practical experiments conducted over a long period of time the solution discussed below has been proven and found applicable.

1. Plants which have an epiphytic or semi-epiphytic mode of life are attached — starting from stage 3. of development discussed above, that is, when they already have recognizable leaves and roots — to vertically oriented substrates made of inorganic or synthetic material (preferably polystyrene foam) in an orientation corresponding to their respective direction of growth.

2. In front of or above a group of the plant-carrying substrates irrigating devices are arranged for uniformly watering all plants.
3. In contradistinction to the general view, at nightfall, as soon as the sun no longer reaches the plants, the watering devices are activated for a period within which all plants can be thoroughly wetted. This step may be repeated once or several times during the night, dependent upon the particular plant type and the season of the year.
4. At daytime, the plants remain dry.
5. In the cultivating space (which may be, for example, a conventional, closable greenhouse) in which the invention is practiced, air circulation (draft) is maintained by fans or other devices.
6. The plants may be attached to the substrate in groups or individually from one side or several sides; the treatment is the same for each instance.
7. If the living space for the plants becomes too small on their substrate, which, for grown plants is usually the case after 5–6 years, the plants are divided and the parts are further separately cultivated with the same process steps.

By way of example, plants from the following botanical divisions, orders and families may be cultivated according to the invention: Orchidaceae, Bromeliaceae, Araceae, Piperales, Pteridophyta; further, epiphytically growing cacti, such as Phyllocactus truncatus, as well as hybrids of epiphytically growing plants. Of particular significance are plants of the family Orchidaceae, but genuses and species of the botanical division Pteridophyta, the botanic order of Piperales and the botanic families of Bromeliaceae and Araceae may also gain in importance.

For practicing the method according to the invention, the plants have to be attached to plates or bodies made of inorganic or organic, non-native (that is, not grown) material. The type of the material is of no significance by itself; it is, however, a precondition that the material, after stopping the irrigation, can dry in a short time, generally within 2 to 3 hours. This required characteristic tends to determine both the type of material as well as the nature of its surface. It is noted that, for example, one may make the selection from any durable stable material which does not decompose and which further does not release to the environment or the plants matter that can be harmful to the plants. Thus, possible materials are metals, for example iron, cast iron, refined steel or aluminum, or synthetic materials, also in the form of synthetic foams, for example, polystyrene, polyurethane or polyamide. Foam materials with closed pores are preferred.

The surface of the material should be such that it retains water for no longer than maximum two to three hours. Thereafter, the surface should have no major depressions and thus should be preferably of planar structure. Synthetic foam materials should have, at least on their surface, closed pores.

It follows from the above discussion that native materials such as woods, wood barks or materials which are made entirely or preponderantly from wood, or wood wastes such as chip boards, compressed boards, joiners' boards, "Novopan" plates, are not adapted for use as upper surfaces for practicing the method according to the invention, because, in general, they dry slowly and in the presence of water and under the influence of the atmosphere they decompose, decay or undergo other phenomena of disintegration. In case one of these materials is used, its upper surface should be protected by providing it with a protecting coat such as paint, lacquer, foils, oils or impregnating materials.

The type of bodies which carry the above-discussed surface may vary widely. It merely should provide the possibility to orient the outer surface substantially in a vertical direction. Thus, one may use plates, discs, wafers, spheres, cylinders or the like, even massive masonry walls. It is expedient to use in general space-saving arrangements such as vertically standing or suspended boards and arrangments from the outer surface of which the plant roots can be relatively easily removed. It has been found particularly advantageous to use polystyrene foam having a thickness of approximately 5 to 10 cm.

Expediently, the plants are arranged on the surfaces individually in a juxtapositioned or in a vertically adjoining relationship and are fastened in any desired manner; care should merely be taken that the plants are not damaged. Thus, the plants may be attached by tying, for example with thread, strings, cables, wires, clamps, hooks, pins, staples or by means of gluing with adhesive foils, tapes, compatible adhesives, etc.

An example of plant arrangement is shown in the FIGURE. The plants, having roots 1 and upwardly-oriented leaves 2, are held by securing devices, such as wire staples 3 on the large face of a vertically-oriented, relatively flat polystyrene foam board 4. Numerical examples regarding the dimensions and number of boards, as well as distances between plants on the boards and the spacing of the boards will be given later as the specification progresses.

Expediently, the plants are secured at such a distance from one another that they do not obstruct each other during growth and that occasionally required work, such as removal of buds, can be effected without difficulty.

By securing the plant as outlined above, the greatest part of the roots remains on the upper surface and thus does not penetrate into the substrate. Only in this manner can the development of the outer protective layer (velamen) of the roots be ensured. Although the exact function of the velamen is still debated, a well-developed velamen appears to have decisive advantages with regard to the growth of the plant. It is noted that often the roots grow through the foam boards. This is not disadvantageous, since the development of velamen returns to normal as the roots emerge on the other side of the board. Such a root growth is even advantageous, since it gives the plant a better support.

For the efficient practice of the invention, there is needed an apparatus with which the plants, in regular intervals, are irrigated and provided with nutrients at night. The latter may be applied by dissolving them in the water. It has been found expedient to use nutrient compositions with a possible low ballast content, such as gypsum. The water with or without nutrients dissolved therein, is applied to the plants in an appropriate manner, for example by pouring, spraying or watering through showerheads.

The nutrient compositions which may be enriched by commercially available full fertilizer should contain the usual basic nutrients for plants such as nitrogen, phosphorus and potassium, as well as the necessary recognized trace elements. The watering of the plants and their supply with nutrients is carried out at night, that is, from the time darkness sets in until daybreak. The watering should be effected in such a manner that the roots and the entire plant are maintained during the entire night or at least during the preponderant portion of the night in a wet state. It has been found to be generally sufficient to water the plants several times at intervals distributed throughout the entire night.

Automatic spraying devices expediently arranged in front of or above the plants have been proven to be very advantageous for performing the method according to the invention.

In addition to the above-outlined nutrients for epiphytes, occasionally other materials, such as growth-enhancing substances, insecticides and fungicides may also be mixed to the water.

The usual dosages are, for example in case of fertilizing, up to 0.5 pro mille. The salt concentration of the solution which is expressed in conductance, should expediently not exceed 1,000 $\mu S$. This may be checked by means of a conductance measuring instrument.

The above-described process results, by virtue of its radical departure from known methods regarding plant treatment, in the following advantages with respect to conventional methods:

1. There is no longer need for the acquisition, preparation and storing of expensive growing medium.
2. There is no longer need for the acquisition, storing and cleaning of pots, whether made of conventional clay or up-to-date synthetic material.
3. There is no longer need for the expensive potting of the plants, requiring substantial work input.
4. There is no longer need for the even more expensive and time consuming transplanting of the plants every two to three years.
5. There is no longer need for a watering operation requiring expensive and experienced labor.
6. The method according to the invention is the only presently developed process which, in addition to the known automatic control of heat, aeration, shadowing and illumination, also makes possible the control of humidity and watering in an inexpensive and fully automated manner adapted to the plant.

In this manner, there has been made possible a consistent rationalization of developing epiphytically growing orchid species.

EXAMPLE

Ripe seeds of orchid plants of the genus Cattleya and the species Guttata were, under sterile conditions, sown in the usual manner in sowing flasks on a growing medium according to Burgeff/Knudson, such as described by Thomale: *Die Orchideen*, published by E. Ulmer, Stuttgart, 1954, pages 84–88. Within approximately two to three weeks the seed germinated and there developed the so-called protocorms (seedlings) on which, after a while, the first leaves and roots appeared. After approximately 4 to 5 months, the protocorms, which were sown too close to one another, were transplanted under sterile conditions onto new growing media for permitting the development of the individual plants. After the eighth to the 12th month the plants had two to three leaves and two to three roots.

Thereafter, the small plants were removed from the sowing flasks and were attached by means of thin wire hooks onto polystyrene foam ("Styropor") boards which were 200 cm high, 20 cm wide and 5 cm thick. These plates were positioned vertically in the length dimension of a greenhouse in the usual manner. The leaves of the plants were oriented upwardly and the roots developed freely in all directions. The plants were arranged in horizontal rows; the distance between plants in one row was 1 cm and the distance between rows was 1.5 cm. On each of the above-described plates there were thus positioned 6,000 plants and on 1 $m^2$ space there were positioned 6 plates. Above the plates, in a height of 250 cm from the floor, there were arranged irrigating pipes provided with sprinkler nozzles of conventional structure which were able to irrigate the boards thoroughly on each side. During every night, approximately at 7 o'clock, midnight and 5 o'clock in the morning, the watering tubes were automatically opened for a duration of 80 seconds. In each spraying operation they sprinkled during this period, with a water pressure of approximately 5 atm. gauge, 2,000 $cm^3$ water for each $m^2$ floor space which corresponded to a watering of 0.055 $cm^3$ water per plant. During two nights per week, 0.5 gram full fertilizer per liter was added to the water. The nutrient ratio N:P:K of the full fertilizer was 2:0.5:1; the fertilizer was fully water soluble and contained all the known trace elements necessary for the plant growth, except for chloride. When the intensity of the sunlight exceeded 10,000 lux, the greenhouse was shielded by a screen fabric which blocked 50% of the light. The temperature at night was not allowed to drop below 20° C and during the day it rose, under the effect of sunshine, up to 30° C. Upon reaching a temperature of 30° C, the usual aerating windows of the greenhouse were opened and, as a result, a further substantial temperature increase could be avoided. In all parts of the greenhouse the air was circulated day and night, without interruption, by means of fans with such intensity that smoke was visibly moved.

After 2 years, the plants were grown together to such an extent that they had to be transplanted onto new boards with increased spacing. For this purpose, they were removed from the old boards in such a manner that as few roots as possible were destroyed. This was possible without difficulty, since with the roots parts of the board could be removed also. Roots that were too long were shortened to 5 cm. The boards always had the same dimensions as the old ones. In this instance, the plants were attached at a distance of 3 cm in their row with a row distance of 5 cm. In this manner, each board now carried 648 plants. Again, six boards for each $m^2$ floor space were provided. The treatment was identical to that described earlier, but each plant, with the identical amount of water emitted by the sprinkler system, now received 0.515 $cm^3$ water in each watering period.

After a further two years it became again necessary to arrange the plants at a greater distance from one another. They were again removed from their board as described above and attached to new boards in the same manner, at a plant distance of 10 cm in each row and with a row distance of 7 cm. Each board now carried 150 plants and there were again six boards for every $m^2$ floor space. Watering, fertilizing and ventilating remained the same, but the night temperature was now set at 18° C minimum, the air louvers were opened already at 25° C and the screens were applied only at 40,000 lux or if the temperature exceeded 35° C. In this stage, most plants bloomed for the first time. During each irrigation step, each individual plant now received — with the same output of the sprinkler system — a water amount of 2.2 cm$^3$.

After another 2 years, the plants again had to be arranged at a larger distance from one another. In the same manner as already described, on the front and rear sides of new boards, 10 plants were arranged in one vertical row. This was the final plant arrangement for grown plants. Dependent upon the extent of growth, every 3 to 5 years the plants have to be removed, separated in the usual manner and reattached with the same spacing. Used boards can be reused unless they were damaged. The treatment is identical to that described above. At this stage, the plants are in full bloom production. With the same water output from the sprinkler system as before, at this stage each plant now receives 16.66 cm$^3$ of water during each watering period.

In the growing phase described in the preceding paragraph, comparison tests were conducted, particularly for the purpose of demonstrating the superior results of nightime watering as opposed to daytime watering.

Six boards, each of which thus supported 20 plants of the same species, were set up in a greenhouse which offered the same growing conditions as described before, but where the watering was carried out at daytime.

In the test rows 1,2 and 3, the plates were watered at times specified below, with the same quantities (and their multiples) calculated for nightime watering.

Row 1 was watered at 7:00 and 11:00 in the morning and at 3:00 in the afternoon, whereby each plant received 16.66 cm$^3$ of water per watering, that is, 49.8 cm$^3$ water per day.

Row 2 was watered at 7:00, 9:00 and 11:00 in the morning and at 1:00 and 3:00 in the afternoon. Each plant received 16.66 cm$^3$ of water per watering, that is, 83.30 cm$^3$ of water per day.

Row 3 was watered at 7:00, 8:00, 9:00, 10:00 and 11:00 in the morning, at noon as well as at 1:00, 2:00 and 3:00 in the afternoon. Each plant, again, received 16.66 cm$^3$ of water, that is, 149.94 cm$^3$ of water per day.

The last watering was effected in each instance not later than at 3:00 in the afternoon to ensure that by nightfall the plants were again dry.

The results were found to be as follows:

Row 1

For 120 plants per m$^2$ of greenhouse floor space, 5,976 cm$^3$ of water was sprayed per m$^2$. The plants showed very rapidly a faded color, the pseudo-bulbs shrank, hardly any new roots were formed after 6 weeks all plants dried out.

Row 2

For 120 plants per m$^2$ of greenhouse floor space, 9,996 cm$^3$ of water was sprayed per m$^2$. With nearly twice the water quantity as compared to row 1, first there was obtained a satisfactory root development. After 3 weeks, however, it could already been determined that the plants which at the upper portion of the boards were exposed to more sunlight, ceased their root growth. After 10 weeks, 20% of the plants dried out, the remainder showed a significantly decreased growth with weak root formation and weakly developed shoots.

Row 3

For 120 plants per m$^2$ of greenhouse floor space, 17,992.8 cm$^3$ of water was sprayed per m$^2$. With the treble quantity of water as compared to row 1, there was achieved a satisfactory root development. The plants continued to grow normally and gave a fresh impression. After 2 weeks, however, the plants, because of settling of algae, began to turn green and after 6 weeks there was formed a dense algae layer on the roots and on the boards in the vicinity of the roots. After 12 weeks, approximately ⅔ of the roots died, most of the yound shoots had brown tips or had rotted away. Only 20% of the plants still showed an approximately normal development.

From the above it can be seen that the watering during nightime is one of the deciding factors of the method according to the invention. In case of a watering during daytime, in all instances damages occurred on the plants attached to the boards provided according to the invention.

Even if the higher water consumption by the plants, required by the irradiation by the sun, was equalized during the day by higher water quantities, even at a double water quantity a drying of the plants was observed, while in case of a three-fold water quantity, the plants began to die. Thus, only the combination of the plant-growing on the boards with a nightime watering yields the good results according to the invention.

It will be understood that the above description of the present invention is susceptible to various modifications, changes and adaptations, and the same are intended to be comprehended with the meaning and range of equivalents of the appended claims.

I claim:

1. A method of cultivating plants capable of epiphytic culture, comprising the following steps:
   a. individually attaching the plants in their early stage when they already have recognizable leaves and roots directly to a non-native soilless surface lacking open pores;
   b. throughout their cultivation, maintaining the plants and the surface in a dry condition at daytime; and
   c. throughout their cultivation, maintaining the plants and the surface in a wet condition from nightfall until daybreak by thorough watering.

2. A method as defined in claim 1, including the step of adding nutrients to the water utilized in step (c).

3. A method as defined in claim 1, wherein step (c) is performed by a sprinkler system.

4. A method as defined in claim 3, wherein step (c) is performed automatically.

5. A method as defined in claim 1, including the step of continuously exposing the plants to an air draft.

6. A method as defined in claim 1, including the step of supporting the substrate in a vertical orientation.

7. A method as defined in claim 6, wherein the step of supporting includes suspending the substrate.

8. A method as defined in claim 1, wherein step (c) is performed periodically during nighttime.

9. A method of cultivating plants capable of epiphytic culture, comprising the following steps:
   a. individually and directly attaching the plants to the surface of a soilless closed-pore substrate of synthetic foam in their early stage when they already have recognizable leaves and roots;
   b. throughout their cultivation, maintaining the plants and the surface in a dry condition at daytime; and
   c. throughout their cultivation, maintaining the plants and the surface in a wet condition from nightfall until daybreak by thorough watering.

* * * * *